US010156322B2

(12) United States Patent
Rzasa et al.

(10) Patent No.: US 10,156,322 B2
(45) Date of Patent: Dec. 18, 2018

(54) MULTIFUNCTIONAL SOLID-STATE LIGHT BULB

(71) Applicants: Daniel Rzasa, Rancho Cucamonga, CA (US); Merle Frank, Puyallup, WA (US)

(72) Inventors: Daniel Rzasa, Rancho Cucamonga, CA (US); Merle Frank, Puyallup, WA (US)

(*) Notice: Subject to any disclaimer, the term of this patent is extended or adjusted under 35 U.S.C. 154(b) by 0 days.

(21) Appl. No.: 15/623,362

(22) Filed: Jun. 14, 2017

(65) Prior Publication Data

US 2018/0112834 A1 Apr. 26, 2018

Related U.S. Application Data

(60) Provisional application No. 62/412,228, filed on Oct. 24, 2016.

(51) Int. Cl.
| | |
|---|---|
| *F21L 4/00* | (2006.01) |
| *F21K 9/238* | (2016.01) |
| *F21K 9/232* | (2016.01) |
| *F21V 3/02* | (2006.01) |
| *F21K 9/235* | (2016.01) |
| *F21S 9/02* | (2006.01) |
| *F21V 23/04* | (2006.01) |
| *F21K 9/237* | (2016.01) |
| *F21L 4/08* | (2006.01) |
| *F21V 29/83* | (2015.01) |
| *H05B 37/02* | (2006.01) |
| *F21Y 115/10* | (2016.01) |

(52) U.S. Cl.
CPC .......... *F21K 9/238* (2016.08); *F21K 9/232* (2016.08); *F21K 9/235* (2016.08); *F21K 9/237* (2016.08); *F21L 4/08* (2013.01); *F21S 9/02* (2013.01); *F21V 3/02* (2013.01); *F21V 23/04* (2013.01); *F21V 23/0407* (2013.01); *F21V 29/83* (2015.01); *H05B 37/0218* (2013.01); *F21Y 2115/10* (2016.08)

(58) Field of Classification Search
CPC .............................. F21K 9/235; F21V 19/006
See application file for complete search history.

(56) References Cited

U.S. PATENT DOCUMENTS

| | | | |
|---|---|---|---|
| 5,381,070 A | * | 1/1995 | Tuttle ................. H01J 5/54 313/318.01 |
| 8,415,901 B2 | | 4/2013 | Recker et al. |
| 8,770,771 B2 | | 7/2014 | Preta et al. |
| 9,608,394 B2 | * | 3/2017 | Fruhauff ............. H01R 33/22 |
| 2007/0275576 A1 | * | 11/2007 | Yang ................... H01R 33/22 439/76.1 |
| 2012/0120243 A1 | * | 5/2012 | Chien ................. H04N 5/2354 348/159 |
| 2017/0089556 A1 | * | 3/2017 | Ticktin ................ F21V 21/22 |

* cited by examiner

*Primary Examiner* — Evan Dzierzynski
(74) *Attorney, Agent, or Firm* — Galvin Patent Law LLC; Brian R. Galvin

(57) ABSTRACT

A multifunction solid-state light bulb comprising a dome-shape lamp with a solid-state semiconductor light source and an extendable bulb neck that may transform bulb into a flashlight, and having multiple modes on direct current and alternating current.

1 Claim, 16 Drawing Sheets

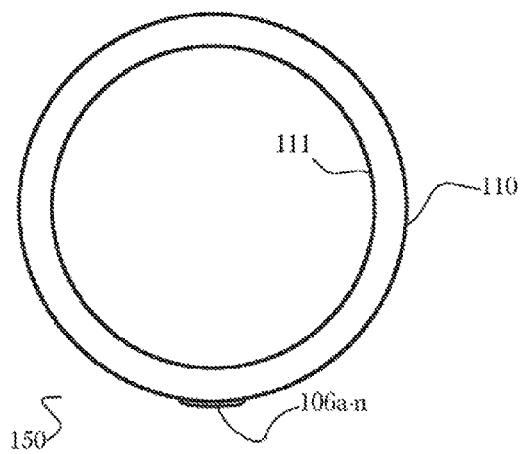
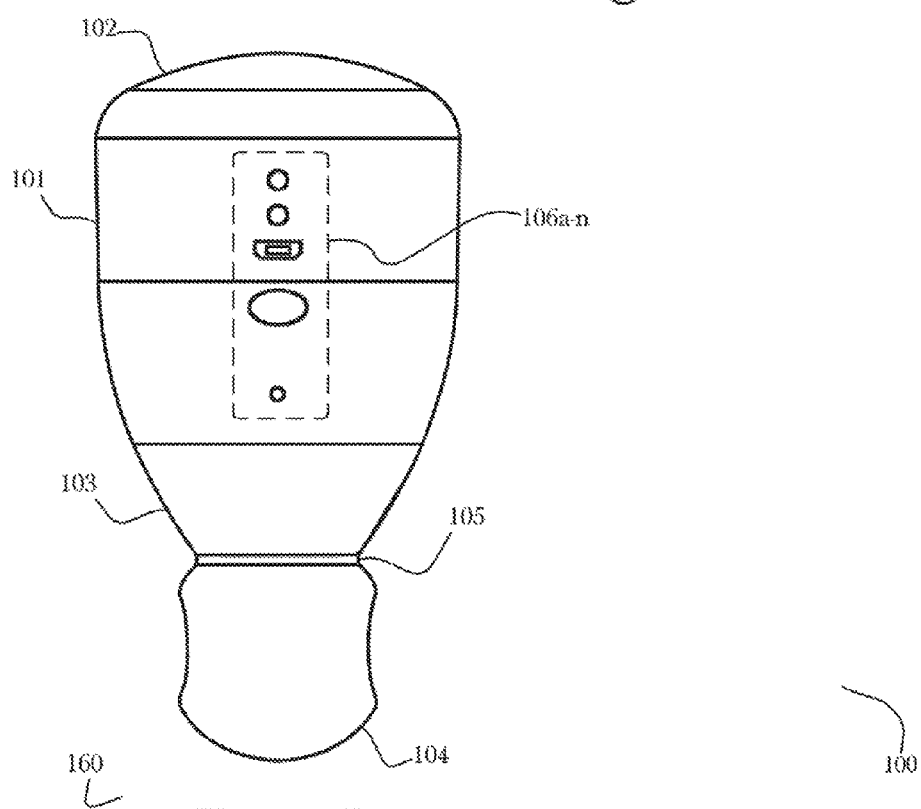
Fig. 1A
Fig. 1B
Fig. 1

MULTIFUNCTIONAL SOLID-STATE LIGHT BULB

CROSS-REFERENCE TO RELATED APPLICATIONS

This application claims priority to U.S. provisional patent application 62/412,228, titled "MULTIFUNCTIONAL SOLID-STATE LIGHT BULB", which was filed on Oct. 24, 2016, the entire specifications of each of which are incorporated herein by reference.

BACKGROUND

Field of the Art

The disclosure relates to the field of light bulbs, and more particularly to a solid-state lighting (SSL) light bulb with an extendable bulb neck and multiple mode functions.

Discussion of the State of the Art

In the field of solid-state lighting (SSL) light bulbs, typical SSL light bulbs run on a direct current (DC) electrical power supply and an appropriate driver to convert alternating current (AC) to DC. Generally, these light bulbs can only serve in one function as either an emergency light or a household light. SSL light bulbs are typically not interchangeable as a household light bulb and as a flashlight.

What is needed is an SSL light bulb that functions on both AC power and DC power, can be used indoors equally as well as outdoors, and can work interchangeably as a light bulb and a flashlight; thereby minimizing the need for multiple SSL lights for each function.

SUMMARY

Accordingly, the inventor has conceived and reduced to practice, a solid-state lighting (SSL) light bulb that has multiple lighting functions (modes), and an extendable handle so that a person may use the light bulb as a flashlight in an emergency situation.

According to one aspect, a multifunctional solid-state light bulb, comprising: a hollow body portion having a domed shape and formed of a material having sufficient transparency to allow at least partial transmission light from a light source placed within the hollow body portion, and comprising a plurality of external features configured to direct the operation of the light bulb, and comprising an internal power supply; a bulb neck extension comprising a tubular portion of a rigid material and a bulb plug end configured to be mated to an external bulb socket, wherein the tubular portion is configured to conceal at least a portion of the external features of the hollow body portion while in a closed position and expose those same features while in an extended position; and a bulb cover that is affixed to a head of the light bulb, comprising a material configured to allow at least partial light transmission; a solid-state semiconductor light source; a locking mechanism comprising a base for the device that can be adjusted along the bulb neck extension to lengthen the light bulb; and wherein the plurality of external features comprise at least a clickable button that enables and disables the internal power supply when pressed, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 1, is a diagram illustrating an exemplary concept FIG. 1A and FIG. 1B of a light bulb structure, according to one aspect, illustrating all components of an assembled light bulb.

DETAILED DESCRIPTION

The inventor has conceived, and reduced to practice, a multi-functional solid-state lighting light bulb, that may be used on either alternating current or direct current, and may be used as a flashlight or as an emergency light or an indoor household light interchangeably.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 10:
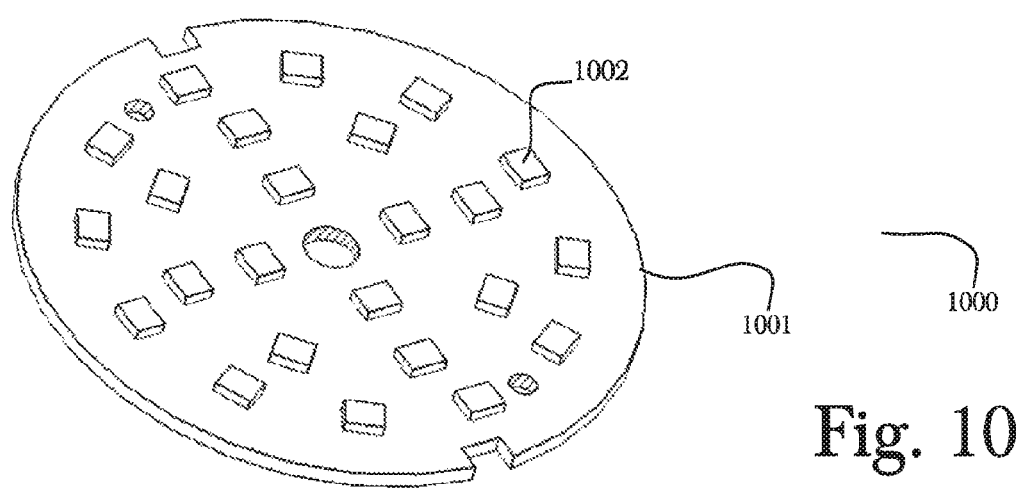
FIG. 10 is a diagram illustrating an exemplary solid-state semiconductor light, according to one aspect.

FIG. 1 is a diagram illustrating an exemplary concept FIGS. 1A, 1B of a multifunctional light bulb structure 100, according to one aspect, illustrating all parts 150, 160 of an assembled light bulb with 150 illustrating an aerial view of an assembled light bulb. According to the aspect 160, a light bulb lamp 101 may comprise a generally dome-type bulb having solid walls (generally forming an A-shape frame, however it should be appreciated that other final lamp shapes may be used according to a desired arrangement or use case, such as using a spiral lamp shape or a candle lamp shape, or other shape) formed of solid, opaque or either fully or partially translucent or transparent material such as metal or plastic, and configured to enclose a light source (FIG. 10) within lamp 101 when assembled; and configured to contain cut-out spaces 106a-n for various arrangements and configurations of sensors, ports, signals, or buttons (it should be appreciated that other ports such as a Micro-DVI, HDMI, or other port types may be used according to a desired arrangement or use case, and that the physical arrangement of ports may vary) to control enclosed light source (FIG. 10). Lamp 101 is configured for cut-out spaces 106a-n for sensors such as an ambient light sensor for multifunction modes (FIG. 13), ports such as USB for connecting to a system for charging or other uses, signals such as to indicate that charging is in progress or complete, and buttons such as could be used for mode or power selection, for example to select different brightness or color settings, strobe effects or other pulse or interval-based lighting behaviors, or to alter the polarity of connectors to external power to accommodate various light bulb sockets that may be encountered. It should be appreciated that other ports such as Micro-DVI, HDMI, or other port types may be used according to a desired arrangement or use case; as it should also be appreciated that other signals may be used such as low battery signal or other signal may be used according to a desired arrangement or use case, and that the physical arrangement of such features may vary).

Further according to the aspect, a lamp cover 102 may comprise a generally rounded shape having semi-translucent or translucent walls formed of a material such as glass or plastic, and configured to fit on top of lamp 101 to further enclose light source (FIG. 10). Attached to base of lamp 101 is locking mechanism 103, formed of a solid material such as metal or plastic (it should be appreciated that other bases for a light bulb lamp such as a heatsink or ballast housing may be used according to a desired arrangement or use case). Extendable bulb neck 105 runs through center of locking mechanism 103 and lamp 101; bulb neck 105 may comprise a generally tubular shape having solid walls formed of a material such as plastic with a threaded base for attaching to screw cap base 104. Screw cap base 104 may comprise generally tubular shape sealed at one end and containing threads, having solid walls formed of a material such as metal (generally forming an E27 Edison screw, however it should be appreciated that other final screw cap bases may be used according to a desired arrangement or use case, such as an E26 Medium Edison Screw (MES) or a BA22d Bayonet Mount cap (BC), or other screw cap base). Also according to the aspect 150, aerial view of assembled light bulb 100 shows buttons 106a-n are raised from lamp 101 for an easier use case (it should be appreciated that buttons may be level with lamp body according to a desired arrangement or use case). Lamp cover 110 attaches to lamp, allowing light transmission through top of bulb 111.

Materials used, and arrangements thereof, in the construction of a multifunctional solid-state light bulb 100 may be selected and configured in such a way as to be flame, dust, shock, or water-resistant to various standardized protocols, according to a particular arrangement or use case. For example, materials may be selected that are flame-retardant and electrically-insulating by nature, and construction may be configured to include seals or tight tolerances in various key areas to prevent the ingress of dust or water.

Figure 2:
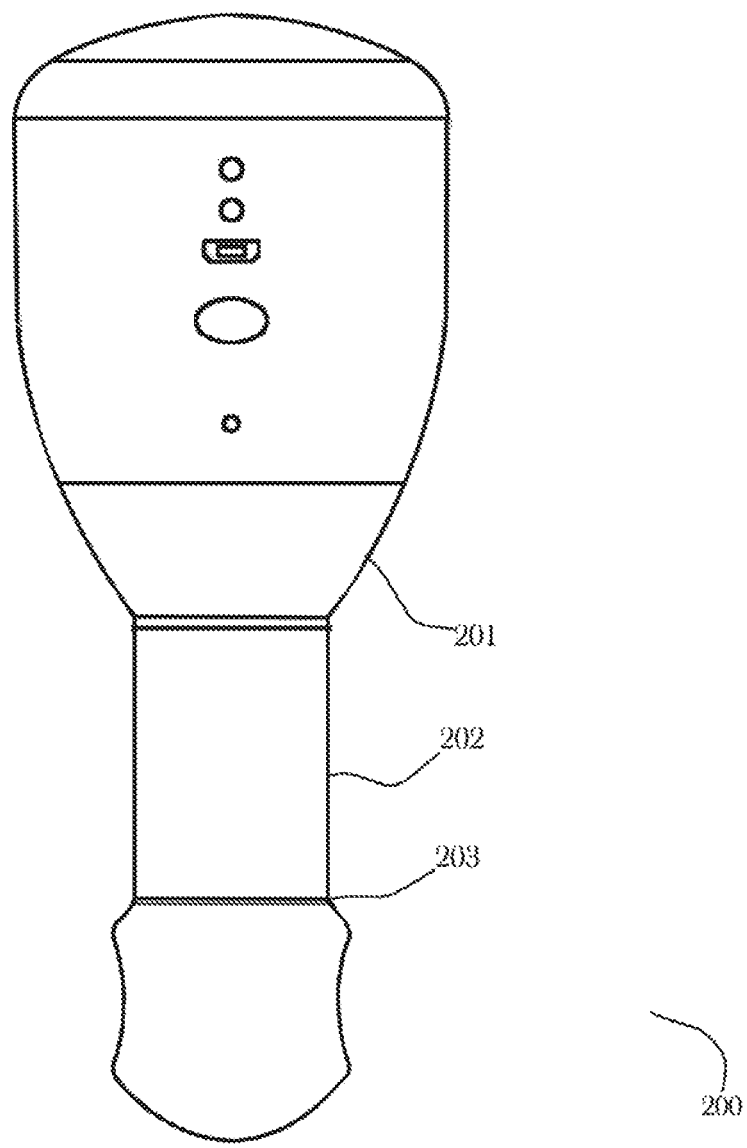
FIG. 2 is a diagram illustrating an exemplary light bulb neck extension, illustrating a flashlight function of the light bulb, according to one aspect.

FIG. 2 is a diagram illustrating an exemplary light bulb neck extension 200, illustrating a flashlight function of the light bulb, according to one aspect. According to the aspect, locking mechanism 201 moves along bulb neck 202 to extend bulb to desired length for use as a flashlight. Extendable bulb neck 202 attaches to screw cap base 203 allowing for an extended bulb in a lamp or wall socket. According to various arrangements or configurations, neck extension 200 may be used to optionally cover or reveal buttons, ports, or other features 106a-n, for example so that when bulb neck extension 200 is in a retracted or closed position, the general shape and appearance of the bulb 100 is that of a traditional light bulb without noticeable external features (as may be suitable for closely fitting in specific types of sockets, or in close spaces originally designed for standard light bulbs), and then by extending or opening bulb neck extension 200, the ports, buttons, and other features 106a-n may be revealed while simultaneously forming an extended handle or grip for use as a flashlight, placing the now-exposed controls in a suitable location for manual operation while using the bulb 100 as a flashlight. In this manner, bulb 100 may be configured to be suitable in use cases designed to accommodate traditional light bulbs without compromising functionality, while also being configured to provide a suitably convenient flashlight mode of operation by extending the bulb neck extension 200 when desired.

Figure 15:
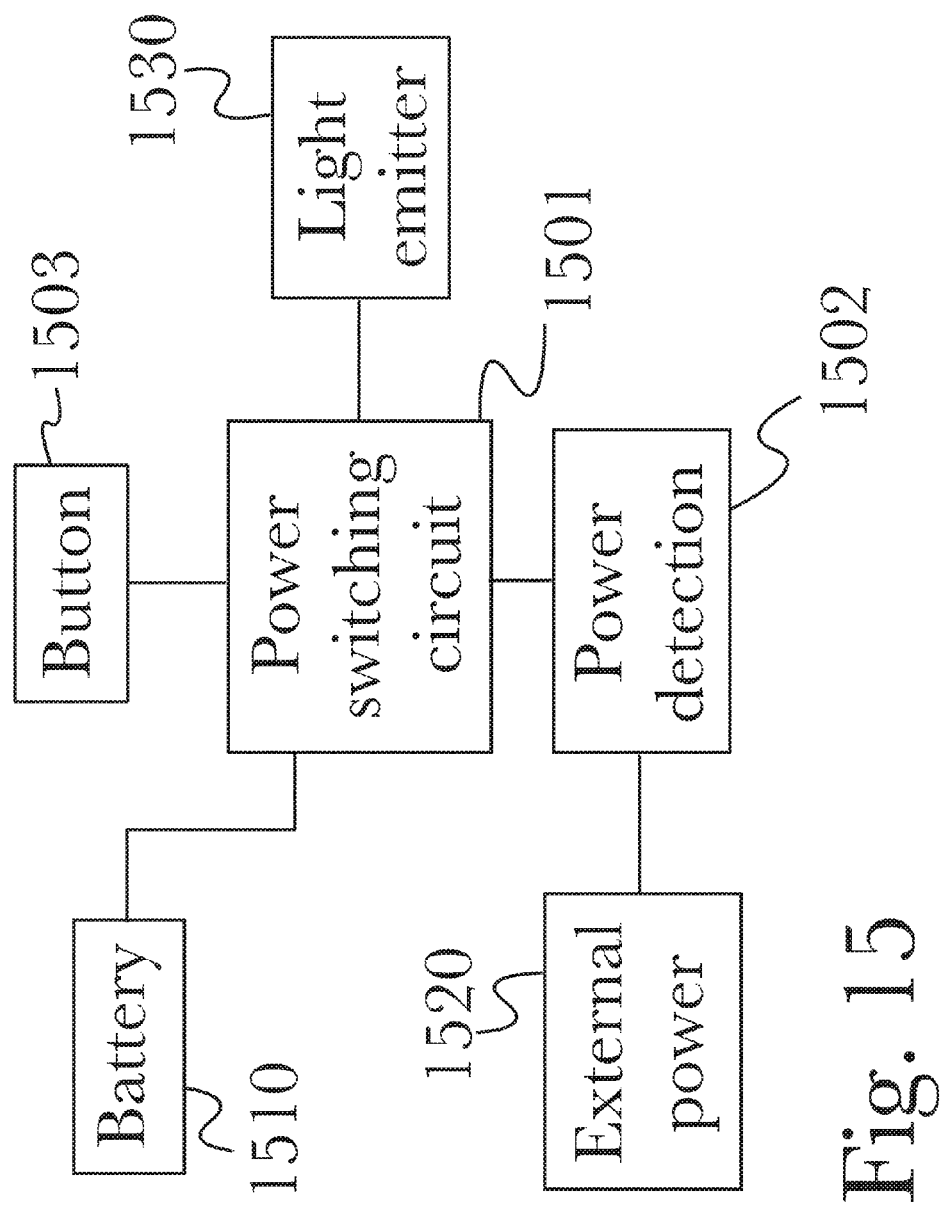
FIG. 15 is a diagram illustrating an abstraction of an exemplary power management circuit arrangement that may be used in the operation of a multifunctional solid-state light bulb, according to one aspect.

FIG. 15 is a diagram illustrating an abstraction of an exemplary power management circuit arrangement that may be used in the operation of a multifunctional solid-state light bulb, according to one aspect. According to the aspect, a power switching circuit 1501 may be used to select between an internal power source such as a battery 1510 and an external power supply 1520 such as a light bulb socket or power outlet. Power switching may be directed automatically by a power detection circuit 1502 that may detect external power connections and select external power 1520 when available, falling back to internal power 1510 when external power is unavailable, or power switching may be performed manually using a button 1503 to select a power source. For example, more than one power source may be connected at a time, and a user may manually select which power to use via a clickable button or toggle 1503, for example in some arrangements that may use internal and external power that provides different voltages, which may affect the light produced by a light emitter 1530 used in the solid-state bulb. For example, some handheld flashlights in the art may use multiple types of internal replaceable battery for power, with the voltage of the battery used affecting the brightness of the light output, giving users the option of using high-performance batteries such as 3-volt or higher lithium batteries for brighter light, or more commonly-available low-voltage alkaline batteries (commonly around 1.5 volts) for the sake of availability. Another use for button 1503 may be to select the polarity or other behavior of an external power connection 1520, for example to accommodate light bulb sockets that may have the leads connected in a different order or to accommodate international travel where external power connections may adhere to differing standards.

Figure 16:
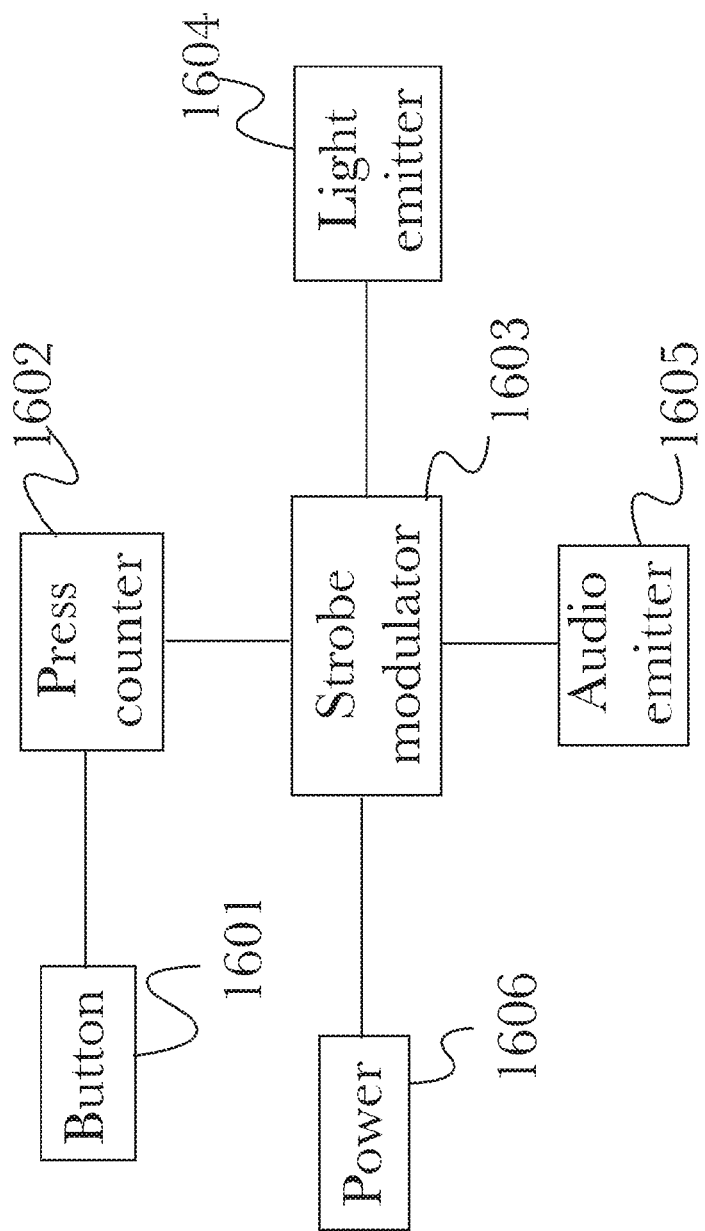
FIG. 16 is a diagram illustrating an abstraction of an exemplary mode management circuit arrangement that may be used in the operation of a multifunctional solid-state light bulb, according to one aspect.

FIG. 16 is a diagram illustrating an abstraction of an exemplary mode management circuit arrangement that may be used in the operation of a multifunctional solid-state light bulb, according to one aspect. According to the aspect, a physical button 1601 may be used to control the operating mode of a multifunctional solid-state light bulb, for example by allowing a user to press button 1601 a number of times in series as detected by a counting circuit 1602 to select an operating mode (as described previously, with reference to FIGS. 11-14). For example, a number of presses may be detected by click counter 1602 and used to trigger a strobe modulation circuit 1603 to direct a light emitter 1604 to operate in a pulsing, flashing, or other output pattern, for example by modulating the input from a power source 1606. Additionally, a series or combination of presses may be used to trigger an audible alarm using an audio emitter 1605, for example to trigger an emergency mode with an audible alarm and a flashing light pattern such as to signal "SOS" via Morse code, as described in FIG. 12. In this manner, various patterns and combinations of short, long, or repeated activations of button 1601 may be used to select various visual and audible operations of a multifunctional solid-state light bulb, according to various configurations.

Detailed Description of Exemplary Embodiments

Figure 3:
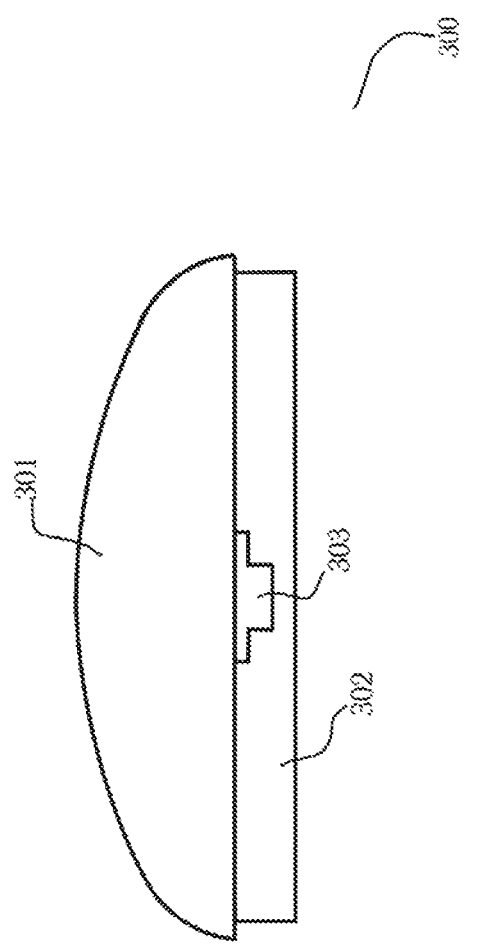
FIG. 3 is a diagram illustrating an exemplary lamp cover, according to one aspect.
Figure 4:
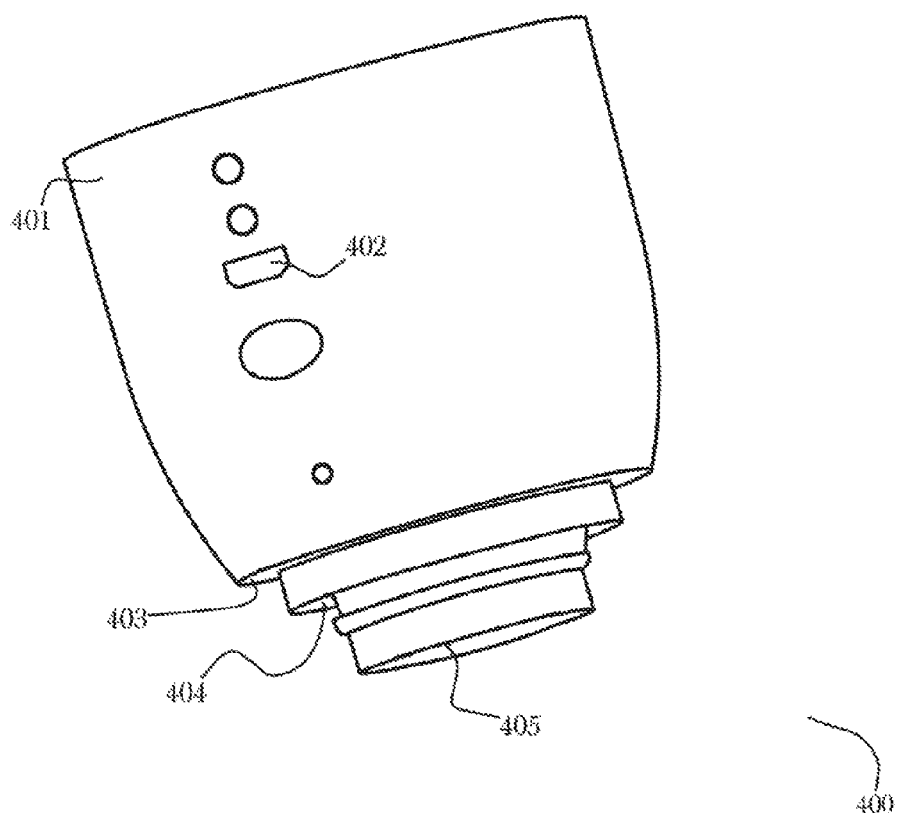
FIG. 4 is a diagram illustrating an exemplary lamp of a light bulb, according to one aspect.

FIG. 3 is a diagram illustrating an exemplary lamp cover 300, according to one aspect. According to the aspect, lamp cover 300 is generally rounded 301 and is comprised of a solid, fully or partially translucent or transparent material such as glass or plastic to allow transmission of a light source (FIG. 10). Lamp cover 300 comprises straight sides 302 underneath rounded dome 301 with two cut-out spaces 303 for attaching to lamp (FIG. 4). Straight sides 302 slide into lamp (FIG. 4) while cut-out spaces 303 attach to sides of lamp covering light source (FIG. 10).

FIG. 4 is a diagram illustrating an exemplary lamp 400 of a light bulb, according to one aspect. According to the aspect, lamp 401 may comprise a generally dome-type shape formed of a solid, opaque or either fully or partially translucent or transparent material such as metal or plastic and configured to enclose a light source (FIG. 10) and an extendable bulb neck (FIG. 7). Lamp 401 comprises cut-out spaces 402 for sensors, ports, buttons, and signals. Spaces 402 may comprise but are not limited to ambient light sensor, mode selection button, USB port, and battery charge signal when bulb is fully assembled. Lamp 401 base narrows down to terraced levels 403, 404, and 405 each slightly narrower than the previous. Locking mechanism (FIG. 6) connects to lamp 401 at level 403 by securely attaching to level 404 with latches 603. Extendable bulb neck (FIG. 7) runs up lamp 401 through level 405 while attaching to locking mechanism (FIG. 6) to secure neck (FIG. 7) to bulb when fully assembled.

Figure 5:
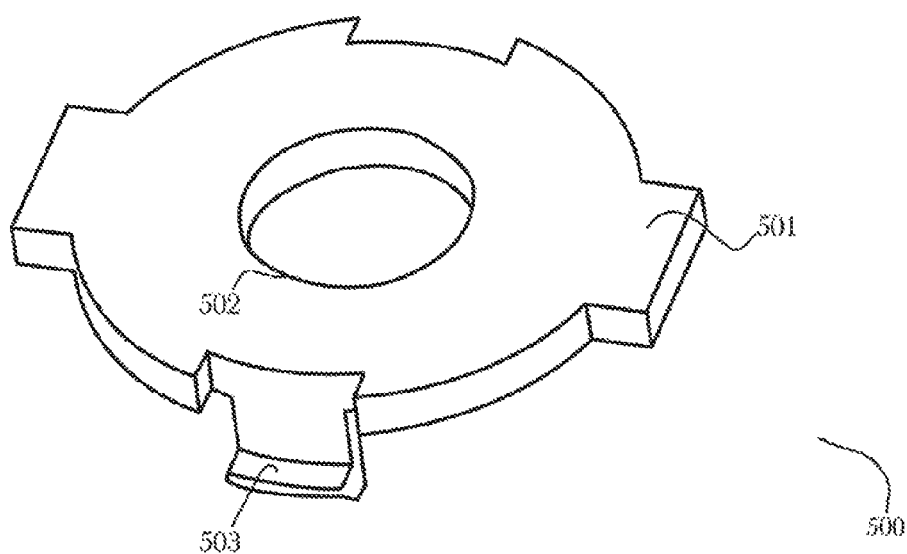
FIG. 5 is a diagram illustrating an exemplary neck cap, according to one aspect.

FIG. 5 is a diagram illustrating an exemplary neck cap 500, according to one aspect. According to the aspect, neck cap 501 may comprise a generally round shape comprised of a solid, opaque or either fully or partially translucent or transparent material such as metal or plastic that securely attaches to extendable bulb neck (FIG. 7) at cut-out spaces 701 with latches 503. Neck cap 501 has a circular cut-out space 502 preventing an airtight seal and serving to release heat from light source (FIG. 10).

Figure 6:
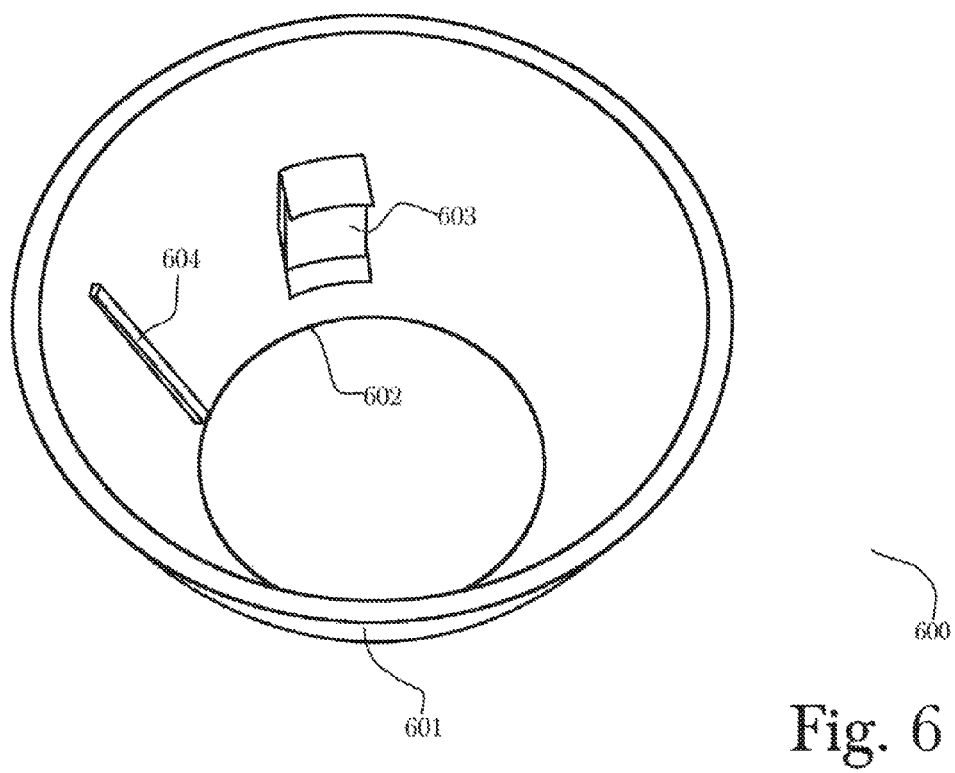
FIG. 6 is a diagram illustrating an exemplary locking mechanism, according to one aspect.
Figure 7:
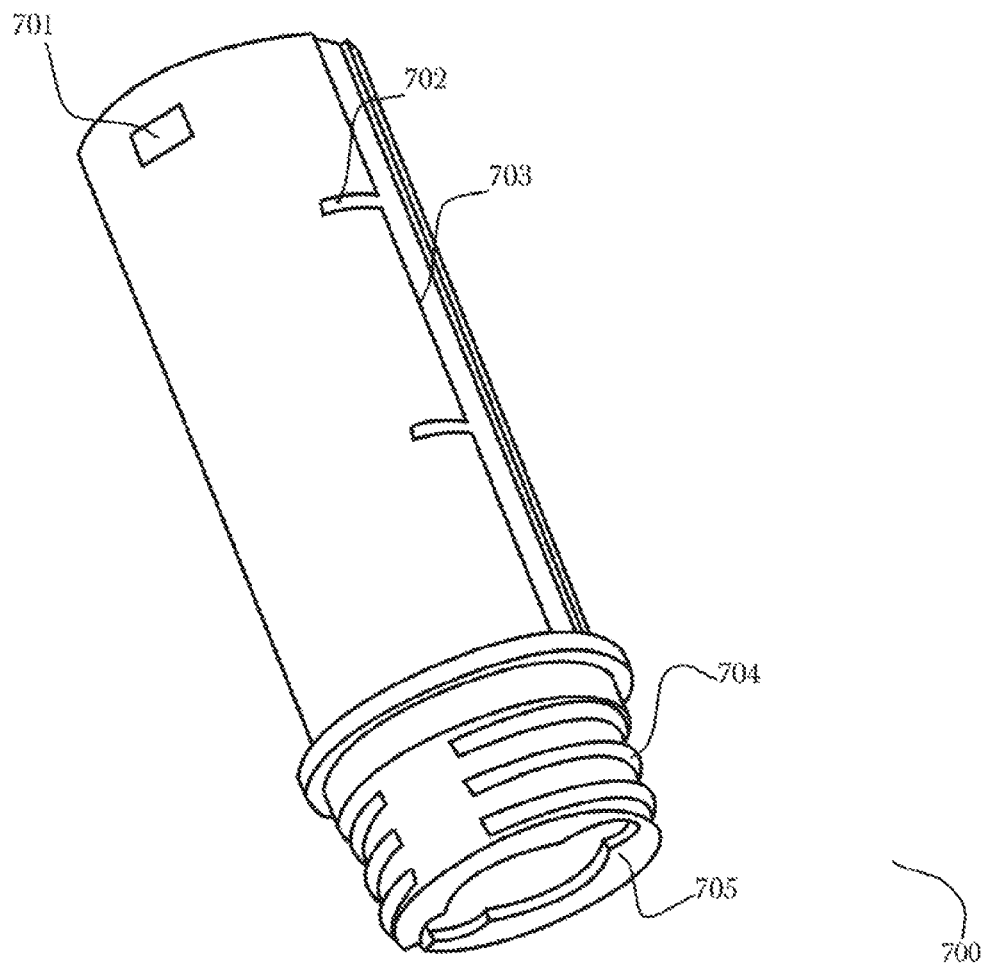
FIG. 7 is a diagram illustrating an exemplary extendable bulb neck, according to one aspect.

FIG. 6 is a diagram illustrating an exemplary locking mechanism 600, according to one aspect. According to the aspect, locking mechanism 601 may comprise a solid, opaque or either fully or partially translucent or transparent material such as metal or plastic and connects to lamp 401 at level 403 by securely attaching to level 404 with latches 603. Extendable bulb neck (FIG. 7) runs up through center of locking mechanism 601; locking mechanism base 602 locks into place at latch 702 on bulb neck (FIG. 7). Fins 604 are located between latches 603 and serve to disperse heat within locking mechanism 601.

FIG. 7 is a diagram illustrating an exemplary extendable bulb neck 700, according to one aspect. According to the aspect, bulb neck 700 may comprise a solid, opaque or either fully or partially translucent or transparent material such as metal or plastic with two cut-out spaces 701 for neck cap (FIG. 5) to lock into. Bulb neck 700 comprises a slot or groove 703 that locking mechanism (FIG. 6) may slide along to a desired length for an extended bulb or flashlight function (FIG. 2). Locks 702 are located at intervals alongside slot or groove 703 for locking mechanism (FIG. 6) to securely lock into place once desired length is reached. Bulb neck base 705 contains threads 704 to securely attach to screw cap base (FIG. 8).

Figure 8:
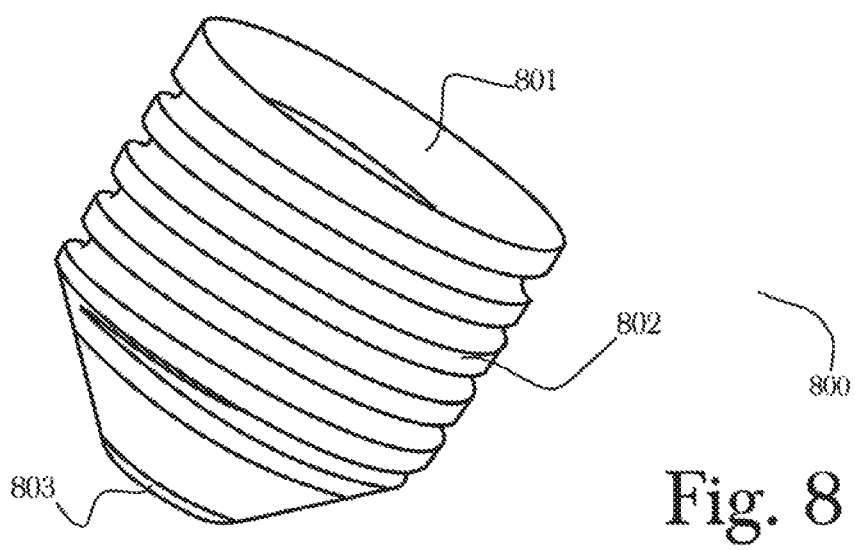
FIG. 8 is a diagram illustrating an exemplary screw cap base, according to one aspect.

FIG. 8 is a diagram illustrating an exemplary screw cap base 800, according to one aspect. According to the aspect, screw cap base 801 may comprise a generally tubular shape with a contact base 803 and containing threads 802, having solid walls formed of a material such as metal (screw cap base may form an Edison screw or Bayonet Mount, or other screw cap base). Screw cap base 801 is threaded 802 so that extendable bulb neck (FIG. 7) may attach to screw cap base securely. Located on bottom of screw cap base 801 is contact base 803 for contact with electrical sockets.

Figure 9:
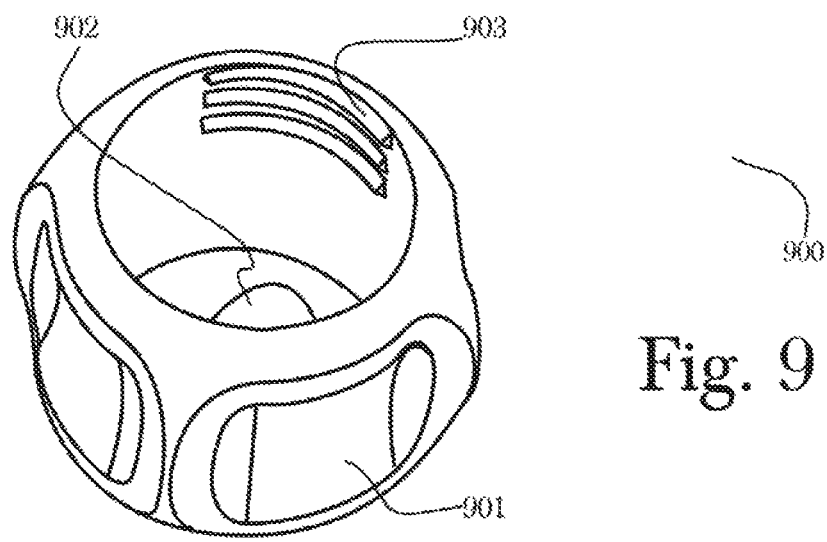
FIG. 9 is a diagram illustrating an exemplary screw cap cover, according to one aspect.

FIG. 9 is a diagram illustrating an exemplary screw cap cover 900, according to one aspect. According to the aspect, screw cap cover 901 may be comprised of a solid insulating material such as plastic. Screw cap cover 901 contains a neutral contact base 902 to prevent electrical discharge from screw cap base (FIG. 8). Threads 903 allow screw cap cover 901 to attach to screw cap base (FIG. 8).

FIG. 10 is a diagram illustrating an exemplary solid-state semiconductor light 1000, according to one aspect. According to the aspect, light source 1000 may be comprised of light-emitting diodes (LEDs) 1002 arranged on a circular base 1001. Base 1001 fits inside lamp (FIG. 4) between lamp cover (FIG. 3) and neck cap (FIG. 5).

Figure 11:
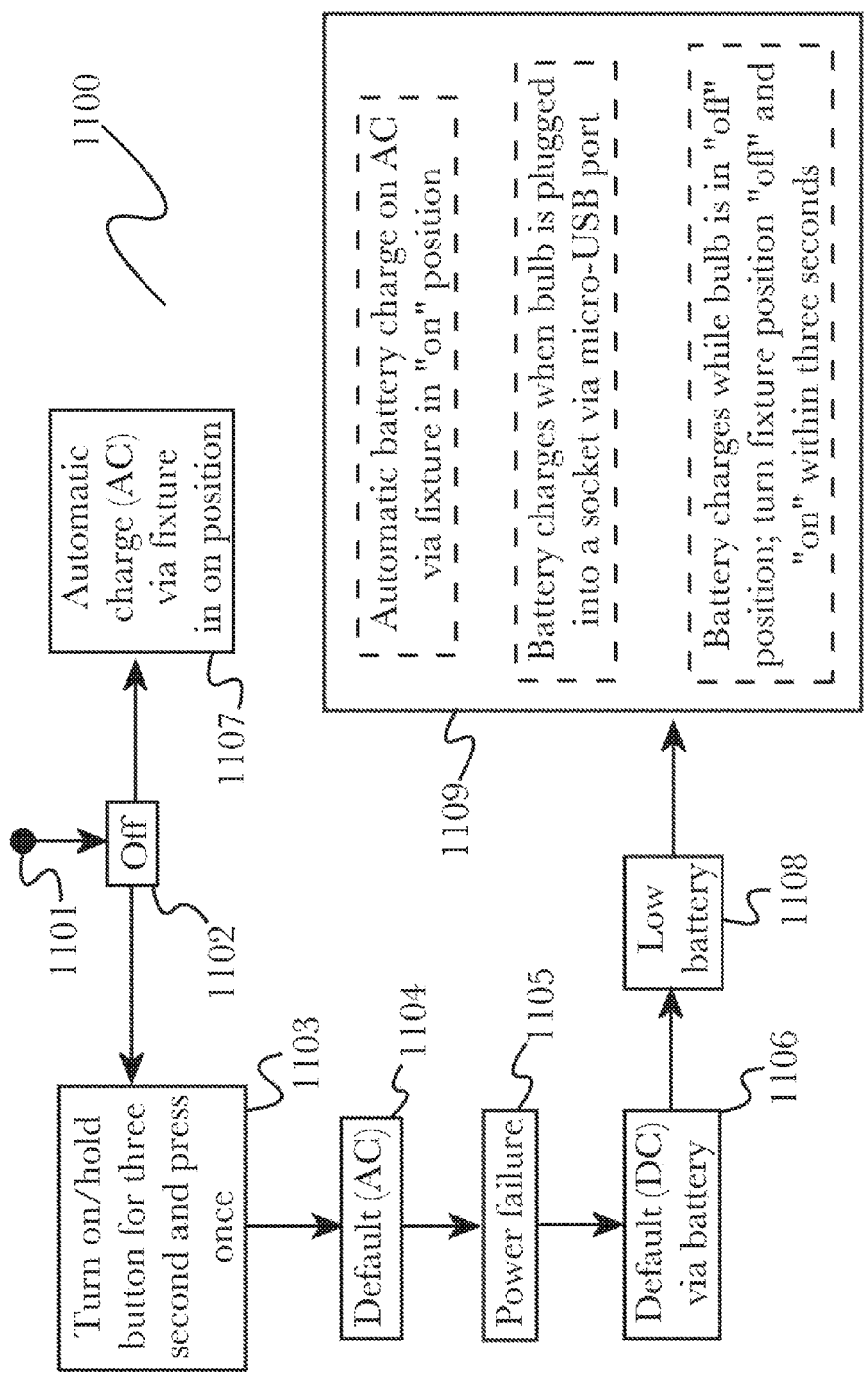
FIG. 11 is an exemplary state diagram illustrating a default mode function, according to one aspect.

FIG. 11 is an exemplary state diagram illustrating a default mode function 1100, according to preferred embodiment. According to the aspect, light bulb 1101 starts in an off state 1102; to turn bulb 1101 on 1103, mode selection button must be held for three seconds and then pressed once to place bulb 1101 into default mode on alternating current (AC) 1104. In the event of a power failure 1105, bulb 1101 switches to default mode on direct current (DC) via battery power 1106. Bulb 1101 will charge automatically on AC when installed into a fixture that is turned on 1107. In the event battery power is low 1108, it may be charged three different ways 1109; automatic battery charge on AC via a fixture that is on, battery can charge when bulb is connected to a socket via micro USB port, and/or battery charges while bulb is turned off by turning fixture off and then back on within three seconds.

Figure 12:
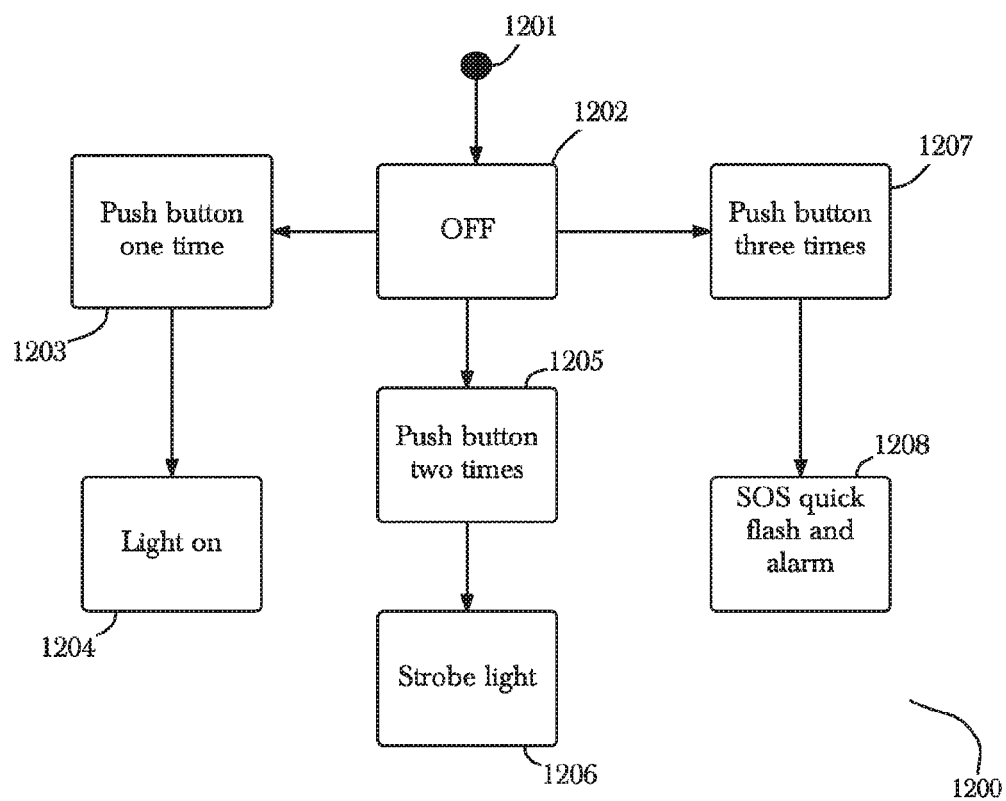
FIG. 12 is an exemplary state diagram illustrating direct current mode functions, according to one aspect.

FIG. 12 is an exemplary state diagram illustrating direct current mode functions 1200, according to one aspect. According to the aspect, light bulb 1201 starts in an off state 1202; user may push mode selection button one time 1203 to turn bulb on 1204. In cases of emergency where a flare is needed, user may press mode selection button two times 1205 and bulb will enter a strobing light pattern 1206. In cases of emergency where an emergency signal is needed, user may press mode selection button three times 1207 and bulb will enter an SOS quick flash and sound an alarm 1208 (it should be noted that pressing mode button a fourth time will return bulb to off state 1202).

Figure 13:
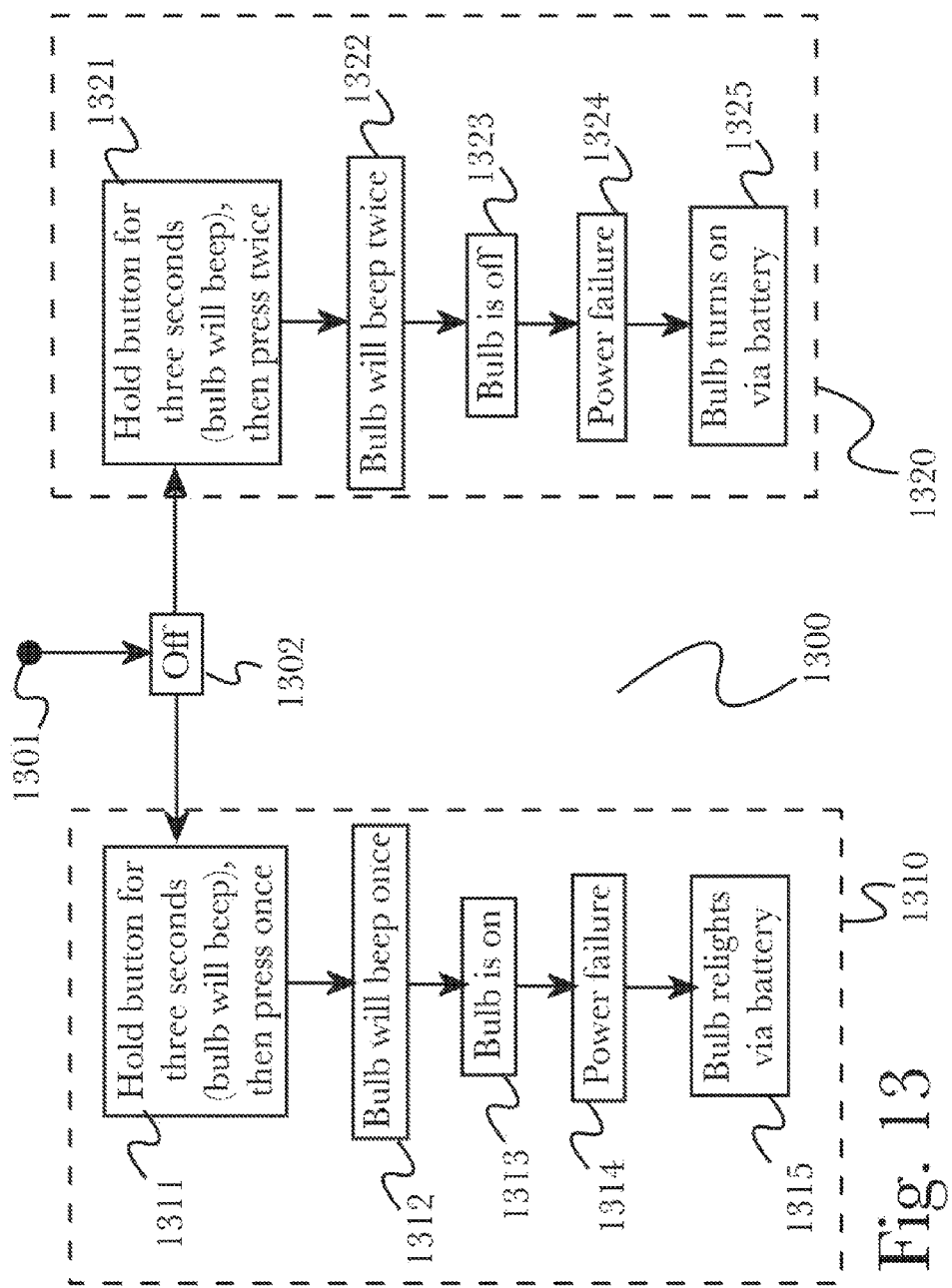
FIG. 13 is another exemplary state diagram illustrating two mode functions while bulb is installed in a fixture, according to one aspect.

FIG. 13 is another exemplary state diagram illustrating two mode functions while bulb is installed in a fixture 1300, according to one aspect, illustrating both mode functions 1310, 1320. According to the aspect 1310, light bulb 1301 starts in an off state 1302 in a light fixture. From off state 1302 mode selection button is held down for three seconds, resulting in a beep from bulb 1301, and then mode selection button is pressed once 1311. Bulb will beep once 1312 more indicating mode has been selected and bulb is turned to an on state 1313. In the event of a power failure 1314 bulb will relight via battery power while remaining in light fixture 1315. According to the aspect 1320, light bulb 1301 starts in an off state 1302 in a light fixture. From off state 1302 mode selection button is held down for three seconds, resulting in a beep from bulb 1301, and then mode selection button is pressed twice 1321. Bulb will beep twice 1322 more indicating mode has been selected and bulb remains in an off state 1323. In the event of a power failure 1324 bulb will turn on via battery power 1325 while remaining in a light fixture.

Figure 14:
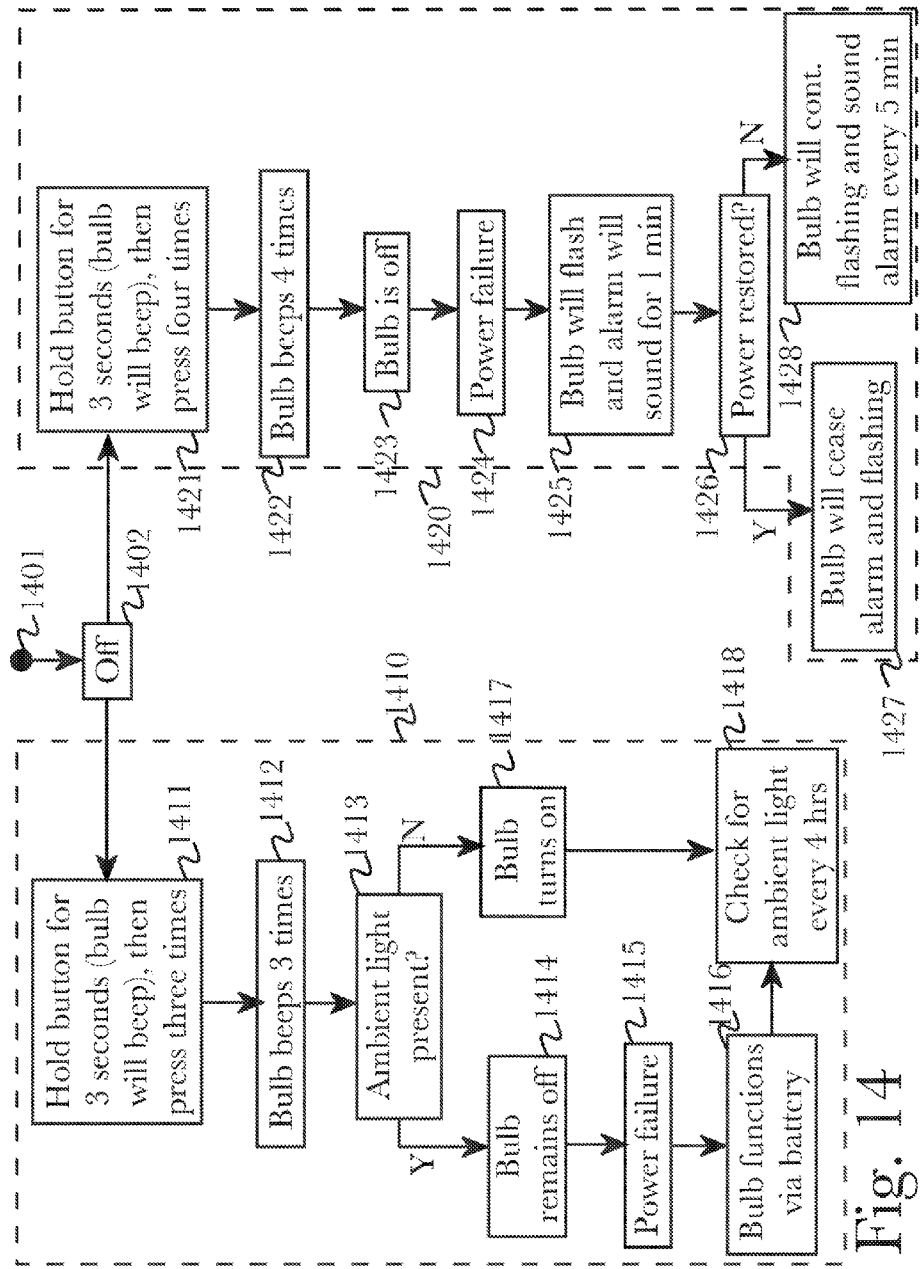
FIG. 14 is an exemplary method diagram illustrating two more mode functions while bulb is installed in a fixture, according to one aspect.

FIG. 14 is an exemplary method diagram illustrating two more mode functions 1400, according to one aspect, illustrating both mode functions 1410, 1420. According to the aspect 1410, light bulb 1401 starts in an off state 1402. From off state 1402 mode selection button is held down for three seconds, resulting in a beep from bulb 1401, and then mode selection button is pressed three times 1411. Bulb will beep three times 1412 indicating mode has been selected. Lighting of bulb in this mode depends on presence of ambient light 1413. If ambient light is present, bulb will remain off 1414. In the event of a power failure 1415, bulb will switch functionality to battery power 1416. If there is no ambient light present, bulb will turn on 1417. Bulb will check for ambient light every four hours 1418 while in this mode, regardless of a power failure or not. According to the aspect 1420, light bulb 1401 starts in an off state 1402. From off state 1402 mode selection button is held down for three seconds, resulting in a beep from bulb 1401, and then mode selection button is pressed four times 1421. Bulb will beep four times 1422 indicating mode has been selected and bulb remains in an off state 1423. In the event of a power failure 1424, bulb will flash intermittently while sounding an alarm for one minute in duration 1425. Continuation of flash and alarm depends on the restoration of power 1426. If power is restored, bulb will cease intermittent flash and alarm 1427. If power has not been restored, bulb will continue to issue an alarm and intermittent flash for a one minute duration, every five minutes 1428 until power is restored 1426.

The skilled person will be aware of a range of possible modifications of the various embodiments described above. Accordingly, the present invention is defined by the claims and their equivalents.

What is claimed is:
1. A multifunctional solid-state light bulb, comprising:
 a hollow body portion having a domed shape, and comprising a plurality of external features configured to direct the operation of the light bulb;
 a bulb neck extension comprising a tubular portion of a rigid material and a bulb plug end configured to be mated to an external bulb socket, wherein the tubular portion is configured to conceal at least a portion of the external features of the hollow body portion while in a closed position and expose those same features while in an extended position; and
 a bulb cover that is affixed to a head of the light bulb, comprising a material configured to allow at least partial light transmission;
 a solid-state semiconductor light source;
 a locking mechanism comprising a base for the device that can be adjusted along the bulb neck extension to lengthen the light bulb.

* * * * *